United States Patent [19]

Repik

[11] 4,248,706
[45] Feb. 3, 1981

[54] TWO STAGE FLUID BED REGENERATION OF SPENT CARBON

[75] Inventor: Albert J. Repik, Charleston, S.C.

[73] Assignee: Westvaco Corporation, New York, N.Y.

[21] Appl. No.: 947,059

[22] Filed: Sep. 29, 1978

[51] Int. Cl.³ ............... B01J 20/34; B01D 53/08; C02F 1/28; C01B 31/10
[52] U.S. Cl. ............... 210/673; 34/10; 34/57 A; 55/60; 55/74; 201/34; 201/31; 202/121; 252/411 R; 252/420; 432/15; 432/58; 422/142; 422/144; 422/145
[58] Field of Search ............ 252/417, 418, 411 R, 252/420; 422/142, 144, 145; 432/15, 58; 34/57 R–57 E; 201/31, 34, 37, 38, 44; 202/120, 121; 210/39, 40; 55/60, 74

[56] References Cited

U.S. PATENT DOCUMENTS

| | | | |
|---|---|---|---|
| 1,893,363 | 1/1933 | Godell | 252/417 |
| 2,501,700 | 3/1950 | Stuart | 252/445 |
| 2,851,428 | 9/1958 | Wayne et al. | 252/417 |
| 2,933,454 | 4/1960 | Repik et al. | 252/419 |
| 2,966,477 | 12/1960 | Walter | 202/121 |
| 2,981,695 | 4/1961 | Perry | 252/417 |
| 3,043,752 | 7/1962 | Foch | 201/44 |
| 3,363,993 | 1/1968 | Campbell | 252/417 |
| 3,423,840 | 1/1969 | Beeken | 432/15 |
| 3,700,563 | 10/1972 | Karweil | 252/411 R |
| 3,801,514 | 4/1974 | Joseph | 252/420 |
| 3,803,029 | 4/1974 | Blecharczyk | 210/16 |
| 3,816,338 | 6/1974 | Corson | 252/420 |
| 3,843,330 | 10/1974 | Commer et al. | 252/417 |
| 4,010,002 | 3/1977 | Degel et al. | 252/411 R |
| 4,017,422 | 4/1977 | Gappa et al. | 252/417 |
| 4,030,876 | 6/1977 | Akae et al. | 252/411 R |
| 4,033,726 | 7/1977 | Pulak | 252/417 |
| 4,058,374 | 11/1977 | Jungten et al. | 55/60 |
| 4,107,084 | 8/1978 | Repik et al. | 252/421 |
| 4,131,565 | 12/1978 | Komori et al. | 252/420 |

FOREIGN PATENT DOCUMENTS 1006043 9/1965 United Kingdom ............ 201/31

*Primary Examiner*—P. E. Konopka
*Attorney, Agent, or Firm*—Richard L. Schmalz; Ernest B. Lipscomb, III; Terry B. McDaniel

[57] ABSTRACT

Method and apparatus are disclosed for regenerating wet spent carbon containing volatile impurities wherein the wet spent carbon is dried in a drying zone utilizing incinerated reactivation zone gaseous effluent. The reactivation zone gaseous effluent is derived by reactivating dried spent carbon in a reactivation zone at pyrolysis conditions to remove volatile components from the adsorbent. Removal is effected utilizing combustion gases. The reactivation zone gaseous effluent is comprised of the combustion gases, the vaporized volatile impurities, and, where steam is employed in the reactivation zone to remove fixed carbon, substantial quantities of carbon monoxide and hydrogen. By interposing the incineration zone between the drying and reactivation zone, efficiency of the overall process is maximized. The combustible components of the combustion gases, the volatile impurities and the carbon monoxide and hydrogen, produced by removal of fixed carbon with steam, are burned in such a manner that the heat of combustion is used for drying the incoming wet spent carbon and for maintaining pyrolysis conditions required for reactivation. The effluent gases may be discharged directly into the atmosphere without further incineration.

13 Claims, 1 Drawing Figure

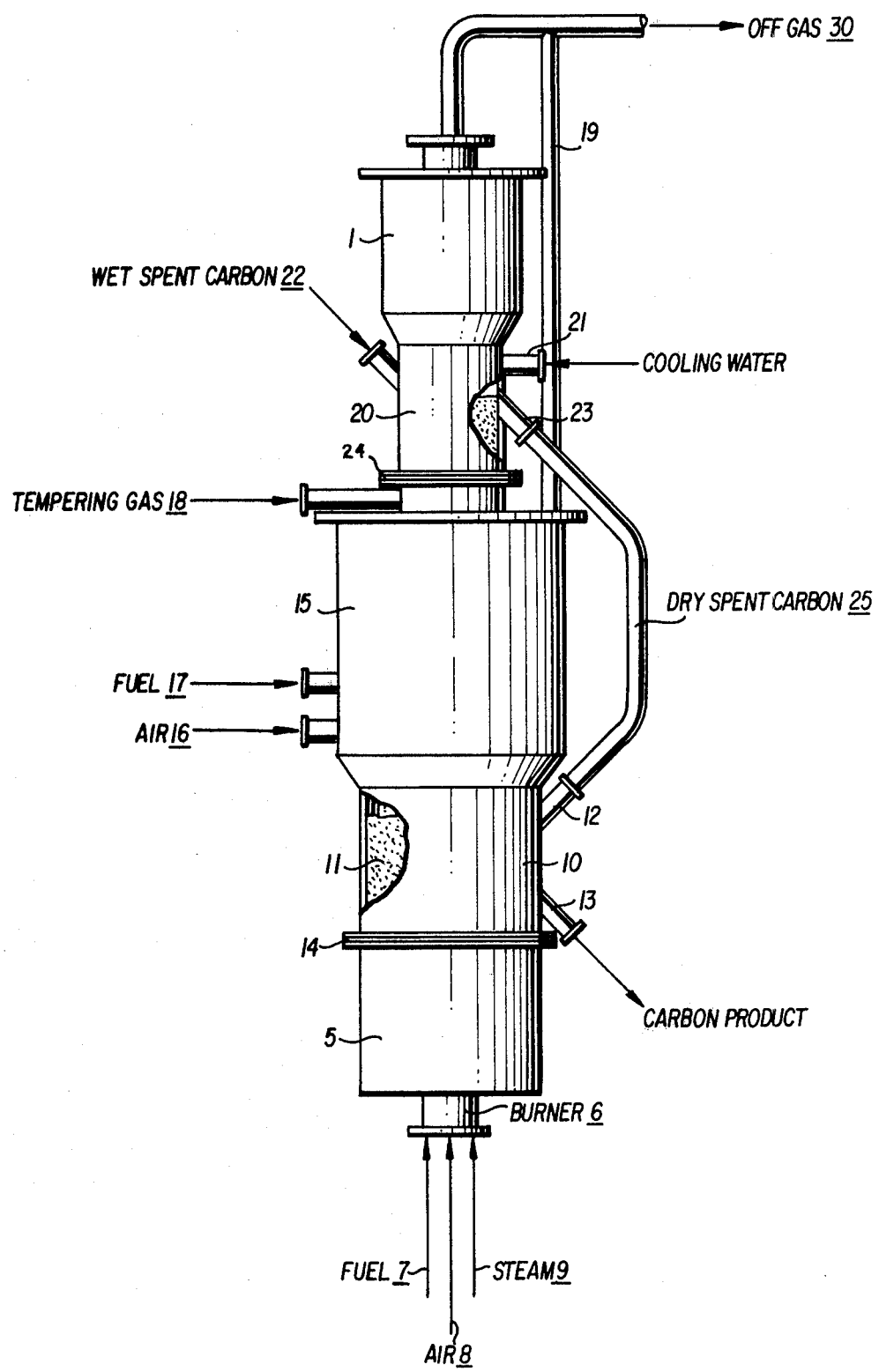

TWO STAGE FLUID BED REGENERATION OF SPENT CARBON

BACKGROUND OF THE INVENTION

1. Field of the Invention

This invention relates generally to process and apparatus for regenerating wet spent carbon adsorbent. More particularly, the present invention is directed to a two stage procedure for regenerating wet spent carbon previously employed for purification of a liquid or gaseous stream.

2. Description of the Prior Art

Carbon is well known for its properties of adsorption and/or absorption (commonly referred to as "sorption") and has long been used for the removal of contaminants from liquids and gases. In the area of decolorization and waste water treatment, carbon has found widespread utilization and efficacy.

Where the quantity of fluid being treated is relatively small, carbon is used until fully spent and then is discarded. On the other hand, in large scale industrial applications, the large quantities of carbon required mandates reuse of carbon for cost effectiveness purposes. Regeneration techniques involving solid sorbents, e.g., alumina, silica gel, molecular sieves and activated carbon have been developed and refined over the years.

Generally, spent sorbent is heated to an elevated temperature in the presence of a carrier gas to remove the sorbed contaminants. One of the problems associated with this procedure is the safe disposal of evolved gaseous contaminants which may contain oderous, noxious and even poisonous substances. Obviously, such contaminants cannot be indiscriminantly discharged into the atmosphere in view of increasingly more stringent environmental regulations and standards for air and water pollutants.

As will be apparent from a more complete review of the following prior art regenerative techniques, the prevalent approach is to thermally regenerate or reactivate carbon and to thereafter dispose of the evolved gaseous sorbate by means of a scrubber or after burner before its discharge to the atmosphere.

A search of the relevant U.S. prior art has uncovered the following references, the following of which are considered to be the most pertinent to the subject invention:

| U.S. Pat. No. | Patentee | Issue Year |
|---|---|---|
| 2,851,428 | Wayne et al | 1958 |
| 2,933,454 | Repik et al | 1960 |
| 2,966,447 | Walter | 1960 |
| 2,981,695 | Peery | 1961 |
| 3,843,330 | Conner et al | 1974 |
| 4,033,726 | Pulak | 1977 |
| 4,058,374 | Juntgen et al | 1977 |

Additionally, there have been uncovered other U.S. Patents which are believed to be of general interest or duplicative of those enumerated above. These references are:

| | | |
|---|---|---|
| 1,893,363 | 3,801,514 | 4,007,116 |
| 2,501,700 | 3,803,029 | 4,010,002 |
| 3,363,993 | 3,816,338 | 4,017,422 |
| 3,700,563 | 3,965,036 | 4,030,876 |

The development and variation in processes and apparatuses for reactivation is illustrated by U.S. Pat. Nos. 2,851,428, 2,933,454, 2,981,695, 3,700,563, 3,803,029, 4,007,116, 4,010,002, 4,030,876 and 4,058,374.

The modes adopted by the prior art for recovering the heat of combustion of off-gases from the reactivation processes are illustrated by U.S. Pat. Nos. 1,893,363, 2,501,700, 2,966,447 and 3,801,514.

U.S. Pat. No. 2,933,454 discloses reactivation of spent carbon using drying and reactivation steps. Off gases evolved leave the system via duct 54, a portion which is recycled and returned via line 50 to the drying bed 10. However, no combustion of the recycled off gas is suggested.

U.S. Pat. No. 2,981,695 suggests burning off gas and utilizing the heat of combustion in an economizer (see column 4, lines 1-3).

U.S. Pat. Nos. 3,843,330 and 4,033,726 relate to regeneration of spent catalyst. Oxidation of carbon deposited on the catalyst is carried out to yield combustible gases containing carbon monoxide. The combustible gases are immediately incinerated as the catalyst is transferred to a collecting chamber. A portion of the heat of combustion is transferred to the catalyst being transported. Air is introduced in the incinerator section to assist in the combustion process.

U.S. Pat. No. 2,966,447 relates to the manufacture of activated carbon. Off gases evolved from the activation procedure are burned with the addition of air in a chamber surrounding the crucibles to which carbonaceous material is downwardly processed. The heat exchange occurs by radiation to the crucible walls.

U.S. Pat. No. 4,058,374 relates to the regeneration of a plurality of adsorbents, e.g., carbon, aluminum oxide, in a single apparatus. Air is additionally introduced between the plural beds via line 14 for regenerating the inorganic agent in bed 7. There is no suggestion that the off gases are incinerated between beds. Rather, in column 7, lines 7-9, as well as in the drawing, the off gases are passed through a scrubber 17 for removal of noxious components therefrom.

None of the references uncovered disclose the combination of process steps and/or structural features of the present invention. Although certain of the references, e.g., U.S. Pat. No. 2,966,447, teach the incineration of off gases to liberate heat for heating the material being processed, none teach the specific utilization of incinerated off gases for directly contacting wet, spent carbon prior to regeneration.

SUMMARY OF THE INVENTION

Generally, the process according to this invention comprises a two stage integrated process wherein combustion gas is utilized to reactivate a previously dried spent carbon adsorbent at pyrolysis conditions to release volatile impurities therefrom. The released volatile impurities are burned in a manner such that the heat of combustion generated is recovered and used for drying incoming wet spent carbon and for maintaining the pyrolysis conditions required for reactivation. Preferably, steam is also employed during reactivation in order to remove fixed carbon. In this manner, the reaction products, carbon monoxide and hydrogen, are burned together along with the volatile impurities.

Incoming wet spent carbon is first preheated in a fluidized drying zone which utilizes hot gases emanating from a zone positioned therebelow, as will be described in greater detail hereinafter. Drying of the wet carbon is effected at conditions such that volatization of the impurities in the carbon is minimized. The dried sorbent containing volatile impurities is then passed to a reactivation zone, wherein reactivation takes place with combustion gas at pyrolysis conditions whereby the volatile components in the sorbent are released therefrom. Reactivated carbon and combustion gases containing the released volatile impurities are produced during reactivation. The reactivated carbon is recovered and the reactivation zone gases are passed to an incineration zone where they are burned to form an incineration zone gaseous effluent. This incineration zone gaseous effluent is used to effect drying of the incoming wet spent carbon.

The incineration zone is preferably contiguous and in open communication with the reactivation zone and at least a portion of the heat required for reactivation is provided by radiation from the incineration zone. The incineration zone is intermediate to the drying zone and reactivation zone. Most preferably, the incineration zone is superimposed over the reactivation zone. By this arrangement, combustion gas is formed below and is passed upwardly through the reactivation zone. The combustion zone gaseous effluent is passed upwardly to the incineration zone. The incineration zone effluent, in turn, is passed upwardly to the drying zone.

Preferably, reactivation is effected with steam in addition to combustion gas.

The reactivation zone gaseous effluent generally contains carbon monoxide and hydrogen as well as combustible volatile impurities. To insure complete combustion, an oxygen-containing gas, such as air, is preferably introduced into the incineration zone where substantially complete combustion of the combustible gaseous effluent components to carbon dioxide and water occurs. Thus, noxious and undesirable gases are rendered harmless prior to discharge into the atmosphere. Where necessary to reach the combustion temperature, or, if required to maintain the required temperature within the drying and/or reactivation zones, fuel can be introduced into and burned within the incineration zone.

It is preferred that the dried spent sorbent is maintained in said reactivation zone in the form of a fluidized bed. It is also preferred that the wet spent sorbent is maintained in said drying zone in the form of a fluidized bed.

The drying zone is generally maintained at a temperature within the range of from about 225° F. to about 350° F. and most preferably at about 300° F. The temperature within said drying zone may conveniently be maintained within the required range by injection of cooling water.

The reactivation zone is maintained at a temperature of from about 1,000° F. to about 2,000° F., preferably within the range of from about 1,400° F. to about 1,800° F. and most preferably at about 1,600° F.

The incineration zone is maintained at a temperature range of about 1,500° F. to about 2,500° F., preferably within the range of from about 1,800° F. to about 2,000° F. and most preferably at about 2,000° F.

The apparatus aspects of this invention comprise a vertically elongated vessel where incoming wet spent carbon is reprocessed efficiently and where the sorbent impurities are converted to harmless gases in accordance with the method heretofore described. The vertically elongated vessel has a combustion chamber disposed at the bottom portion thereof wherein a burner with fuel and air inlet means is located. A regeneration zone is superimposed over the combustion chamber and is separated therefrom by gas distribution means for maintenance of a fluidized bed within the regeneration zone. The regeneration zone has a means for introducing dry spent carbon therein and a means for withdrawing regenerated carbon therefrom. A drying zone is located at the top portion of the elongated vessel. Means are provided for introducing wet spent carbon into the drying zone and for withdrawing dried carbon from the drying zone.

An incineration zone is interposed between the regeneration zone and said drying zone. Means for introducing an oxygen-containing gas into the incineration zone is provided. The incineration zone is defined by and enclosed within the inner walls of a central segment of said elongated vessel. It is essential that the incineration zone be contiguous and in open communication with the regeneration zone so that the heat radiated from the combustion gases and particles can be transmitted to the carbon bed within the regeneration zone. Gas distribution means are located between the incineration zone and the drying zone for maintenance of a carbon fluidized bed therein. Conduit means are provided for automatically transferring dry carbon sorbent from the drying zone to the regeneration zone.

Although the dried carbon may be passed via a downcomer extending through the incineration zone to recover heat therefrom, transfer is preferably carried out outside of the vertically elongated vessel because the high incineration temperatures may detrimentally affect the overall process objectives.

A means for introducing cooling water into the drying zone may be provided. Also, means for introducing steam into the combustion chamber or directly into the reactivation zone is preferably provided.

It is, therefore, an object of this invention to regenerate wet spent carbon sorbent, preferably obtained from a water purification system, in a manner such that activity of the carbon is not adversely affected by excessively elevated combustion temperatures at the loci of carbon treatment thereby enabling its subsequent reuse. Another object of this invention is to provide for recovery of heat values from the products of reactivation and to render the sorbed gases harmless prior to discharge to the atmosphere.

BRIEF DESCRIPTION OF THE DRAWING

The drawing illustrates a vertically elongated vessel for regeneration of spent carbon sorbent having portions of its wall cut away to show the carbon being treated therein.

DETAILED DESCRIPTION OF A PREFERRED EMBODIMENT

Referring to the drawing, the vertically elongated vessel used for regeneration of wet spent carbon sorbent is indicated generally at 1. The vessel is comprised of a combustion chamber 5, regeneration zone 10, incineration zone 15 and drying zone 20. Burner 6 is associated with combustion chamber 5 wherein fuel, e.g., fuel oil or natural gas, and air are introduced through conduits 7, 8, respectively, mixed and combusted to produce combustion gases which are passed upwardly into regeneration zone 10. The combustion gases operate as the carbon fluidizing medium. Steam is also introduced via conduit 9 into the combustion chamber 5 and is passed upwardly into regenerator 10 intermixed with the combustion gas.

Regeneration zone 10 is superimposed over combustion zone 5 and separated therefrom by a preferred plate 14 which supports a fluidized bed of carbon particles 11 in the regeneration zone. Perforated plate 14 is of suitable conventional design for good gas distribution.

The predried carbon is introduced into the regeneration zone via inlet 12 and regenerated carbon is withdrawn via outlet 13. For regenerating the predried carbon, heated combustion gases are passed upwardly through regeneration zone 10 for both fluidizing the particulate carbon 11 and for removing volatile impurities contained in the carbon pores. Steam is passed upwardly into the fluidized carbon particles 11 and reacts with any residual pyrolysis products contained thereon, thereby forming carbon monoxide and hydrogen.

Regeneration zone 10 is maintained at conditions such that the volatile impurities are removed from the carbon by pyrolysis as compared to oxidation reactivation wherein the sorbed impurities are oxidized or combusted by utilizing controlled quantities of an oxygen-containing gas. Generally, a temperature of from about 1,400° F. to about 1,800° F. is maintained in the regeneration zone. A temperature of about 1,600° F. is preferred.

The requisite regeneration temperature is attained and maintained by heat imparted to the carbon particles by the combustion zone effluent and by heat radiated from the incineration zone 15.

Incineration zone 15 is superimposed over regeneration zone 10 and is in open communication and contiguous therewith. Air, or an equivalent oxygen-containing gas, may be introduced therein via conduit 16 to burn the combustible components in the gas issuing upward from fluidized carbon bed 11. During startup, or whenever necessary to maintain the desired incineration temperatures, fuel, e.g., natural gas, may also be introduced directly into the incineration zone via conduit 17. Similarly, tempering gas of low oxygen content and of low temperature may be introduced between incineration zone 15 and drying zone 20 via conduit 18 for the purpose of absorbing excess heat. In cases where the total volume of incineration gas effluent may be in excess of that required for drying, the excess gas may be withdrawn via gas by-pass conduit 19.

In the most preferred embodiment of this invention, conditions within incineration zone 15 are maintained to effect substantially complete combustion of gaseous effluent issuing from the regeneration zone comprised of volatile impurities and carbon monoxide and hydrogen produced by the reaction of steam and fixed carbon. The term "fixed carbon" is intended to describe the residual carbonaceous product remaining on the carbon sorbent from the pyrolysis reaction of the adsorbed impurities.

By maintaining conditions within the incineration zone so as to effect substantially complete combustion of the aforementioned components, the economics of operation are enhanced and the off-gases emitted do not contain either the noxious volatile impurities or high levels of carbon monoxide. Accordingly, these gases may be released to the atmosphere without further treatment and its consequent expense. As heretofore noted, the method of this invention is specifically adapted for the regeneration of carbon sorbent where temperatures of the fluidizing gases are limited and injection and/or buring of a fuel within the fluidized regeneration zone is not desirable. This invention is also applicable to any fluidized bed process in which a temperature level must be maintained in the fluidized bed with temperature limits on the fluidizing gases and/or in cases where injection and burning of fuel in the fluid bed are not feasible.

It should also be noted that the injection of combustion air in the incineration zone above the fluidized bed has an added advantage. The turbulence above the bed is enhanced by the gases formed by the combustion of the regeneration zone effluent and improved mixing of the oxygen with the combustibles results.

Typically, spent carbon particles which are treated according to this invention contain about 8–15% volatile organic matter as a result of being used for water purification or the like. As the spent carbon is heated to about 1,400° F., the organic matter is desorbed from the carbon. The heating value of the spent carbon volatile matter ranges from about 7,500–15,000 BTU per pound with the lower values associated with drinking water treatment and the higher values typical of industrial applications. In addition to volatile matter from spent carbon, heating value is also derived from hydrogen ($H_2$) and carbon monoxide (CO) formed by the reaction of fixed carbon and steam during regeneration.

The following table shows the beneficial effects of utilizing an incineration zone superimposed over a fluidized carbon bed when compared against the same system but without interposition of an incineration zone. The data in the table are projected for wet spent carbon regeneration, based on actual data from operation of a fluid bed for activation. The fuel required to maintain the regeneration bed at 1,450° F. is reduced from 129.8 to 116 standard cubic feet per hour per square foot ($SCFH/ft^2$) when an incineration zone temperature of 2,000° F. is maintained.

| CALCULATED EFFECTS OF INCINERATION ABOVE FLUIDIZED BED FOR REGENERATION OF CARBON | | | |
| --- | --- | --- | --- |
| Natural Gas Fuel Input to Combustion Chamber $SCFH/Ft^2$** | Regeneration Bed Temp. (°F.) | Incineration Zone Temp. (°F.) | Heat* Transferred To Fluidized Bed By Radiation ($BTU/Hr-Ft^2$) |
| Without Incineration | | | |
| 129.8 | 1450 | 1425 | 0 |
| With Incineration | | | |
| 116.0 | 1450 | 2000 | 13,750 |

*Reference Conditions: Bed Temperature, Atm. Pressure
**$Ft^2$ refers to regeneration plate area Referring again to the drawing, it will be noted that the incineration effluent is passed upwardly into the drying zone 20. It is one important aspect of the preferred embodiment of this invention to dry the wet spent carbon feed in a manner which avoids or minimizes desorption of the volatile impurity content in the carbon during drying. Rather, it is an essential part of this invention to desorb the organics in the reactivation/regeneration zone 10. To this end, tempering gas can be introduced at the upper portion of the incinerator via conduit 18 and/or cooling water may be introduced into drying zone 20 at inlet 21. The gases passing upward from the incineration zone to the drying zone pass through a conventional gas distribution plate 24. In drying zone 20, the wet spent carbon is introduced at inlet 22 and withdrawn at outlet 23. Outlet 23 and inlet 12 are connected by conduit 25 which is located outside of the vessel 1.

As will be appreciated, according to this invention, the hot gases evolved by combustion are heat exchanged with incoming wet spent carbon and can be discharged readily to the atmosphere via conduit 30 without further incineration.

Having described the invention in its general aspects, the following example, based on projecting actual fluid bed carbon activation data to a regeneration application, is intended to illustrate the present invention in a more specific form. This example is not however, meant to limit the scope of the invention.

EXAMPLE

One Hundred Thirty-Nine and eight-tenths pounds per hour per square foot ($Ft^2$ refers to regeneration plate area) wet spent carbon (50% moisture) having a particle size range of 8×40 mesh and containing about 14% by weight volatile organic materials is introduced into the apparatus of FIG. 1 for processing. The carbon is dried in zone 20 by hot fluidizing gases traveling upwardly and passed into a fluidized bed reactivation zone 20 maintained at a temperature of about 1,625° F. where it is regenerated resulting in the release of the about 14% volatile impurities contained therein.

Combustion gases and steam are mixed in chamber 5 and passed upwardly into the reactivation zone to provide heat and maintain the carbon particles in a fluidized condition. The combustion gas is formed by burning fuel gas at the rate of 116 SCFH/$Ft^2$ and air at the rate of about 1,137 SCFH/$Ft^2$. Steam is introduced at the rate of 50.7 lb/hr/$ft^2$ into the reactivation zone.

The resulting gaseous effluent from the reactivation zone, which contains 9.9 lb/hr/$ft^2$ combustible volatiles, 0.319 lb mol/hr/$ft^2$ CO, and 0.319 lb mol/hr/$ft^2$ $H_2$, is passed upwardly through the incineration zone. 4.97 lb mol/hr/$ft^2$ air is added to incinerate the combustible materials. 5.6 lb mol/hr/$ft^2$ tempering gas (such as $N_2$ and water vapor at 150° F.) are added to control incineration temperature to 2,000° F. Heat radiated from the incineration zone to the reactivation bed is 13,750 BTU/Hr/$Ft^2$. Without incineration, natural gas to the combustion chamber would have to be increased 13.75 SCFH/$Ft^2$, about 11.9%, to maintain the same reactivation bed temperature. 6.2 lb mol/hr/$ft^2$ of incinerator gas by-passes the dryer. The remaining 7.4 lb mol/hr/$ft^2$ incinerator gas is combined with an additional 3.1 lb mol/hr/$ft^2$ tempering gas added just below the dryer, and these comprise the dryer inlet gases at a reduced temperature of 1,500° F. These gases pass upwardly through a conventional gas distribution plate and are utilized to dry the incoming wet spent carbon. The dryer off-gases and incinerator by-pass gases are combined to form a total off-gas stream which is discharged without further incineration.

It should be appreciated that the present invention is not to be construed as being limited by the illustrative embodiments. It is possible to produce still other embodiments without departing from the inventive concepts herein disclosed. Such embodiments are within the ability of those skilled in the art.

What is claimed is:

1. A method for regenerating wet spent carbon containing organic volatile impurities comprising:

a. heating said wet spent carbon containing said volatile impurities in a drying zone at a temperature wherein volatilization of the impurities in the carbon is minimized utilizing a hereinafter specified drying gas to form dried spent carbon containing volatile impurities;

b. passing said dried spent carbon containing said volatile impurities to a reactivation zone;

c. contacting said dried spent carbon in said reactivation zone with combustion gases at pyrolysis conditions which liberate said volatile impurities therefrom, to form reactivated dried spent carbon and reactivation zone gaseous effluent comprising liberated volatile impurities;

d. passing said reactivation zone gaseous effluent to an incineration zone, said incineration zone being contiguous and in open communication with said reactivation zone; and e. burning the combustible components in said reactivation zone gaseous effluent in said incineration zone to form an incineration zone gaseous effluent, said incineration zone being intermediate between said drying zone and said reactivation zone and said incineration zone gaseous effluent being used as the drying gas in step a.

2. The method of claim 1 wherein said incineration zone is superimposed over said reactivation zone, combustion gas is formed below and passed upwardly through said reactivation zone, reactivation zone gaseous effluent is passed upwardly to said incineration zone and incineration zone effluent is passed upwardly to said drying zone.

3. The method of claim 1 wherein reactivation is effected with steam in addition to combustion gases whereby carbon monoxide and hydrogen are formed in said reactivation zone, said carbon monoxide and hydrogen being burned in said incineration zone along with said liberated volatiles.

4. The method of claim 1 wherein said reactivation zone gaseous effluent contains carbon monoxide and hydrogen and an oxygen-containing gas is introduced into said incineration zone to effect combustion of gaseous effluent components to carbon dioxide and water.

5. The method of claim 4 wherein fuel is introduced into and burned within said incineration zone.

6. The method of claim 4 or 5 wherein tempering gas is introduced between said incineration zone and said drying zone.

7. The method of claim 6 wherein said dried spent carbon is maintained in said reactivation zone in the form of a fluidized bed.

8. The method of claim 7 wherein said drying zone is maintained at a temperature within the range of from about 225° F. to about 350° F.

9. The method of claim 8 wherein the temperature within said drying zone is maintained within the required temperature range by injection therein of cooling water.

10. The method of claim 9 wherein said reactivation zone is maintained at a temperature of from about 1,400° F. to about 1,800° F.

11. The method of claim 10 wherein said incineration zone is maintained at a temperature range of from about 1,800° F. to about 2,000° F.

12. The method of claim 1 wherein the wet spent carbon is recovered from a liquid or gaseous stream, processed according to claim 1 and reused.

13. The method of claim 2 wherein at least a portion of the heat required for reactivation is provided by radiation from said incineration zone.

* * * * *

UNITED STATES PATENT AND TRADEMARK OFFICE
CERTIFICATE OF CORRECTION

PATENT NO. : 4,248,706
DATED : February 3, 1981
INVENTOR(S) : Albert J. Repik

It is certified that error appears in the above–identified patent and that said Letters Patent are hereby corrected as shown below:

In column 5, line 6, "preferred" should read --perforated--.

Signed and Sealed this

Twenty-sixth Day of January 1982

[SEAL]

Attest:

Attesting Officer

GERALD J. MOSSINGHOFF
Commissioner of Patents and Trademarks